May 29, 1956  R. B. GRAY  2,747,614
DIFFERENTIAL PRESSURE RESPONSIVE BELLOWS DEVICE
Filed Dec. 10, 1954  2 Sheets-Sheet 1

FIG. I

Inventor
Robert B Gray
By
Ralph Hammar
Attorney

May 29, 1956  R. B. GRAY  2,747,614
DIFFERENTIAL PRESSURE RESPONSIVE BELLOWS DEVICE
Filed Dec. 10, 1954  2 Sheets-Sheet 2

Inventor
Robert B Gray
Ralph Hammar
Attorney

United States Patent Office 2,747,614
Patented May 29, 1956

2,747,614

DIFFERENTIAL PRESSURE RESPONSIVE
BELLOWS DEVICE

Robert B. Gray, Erie, Pa., assignor to American Meter Company, Incorporated, Erie, Pa., a corporation of Delaware Application December 10, 1954, Serial No. 474,535

4 Claims. (Cl. 137—781)

In differential pressure devices utilizing opposed liquid filled bellows the internal friction in the bellows material and external friction in the devices operated by the bellows tends to cause the response to lag behind the pressure differential. This lag results in a phenomenon in the nature of hysteresis. This invention is intended to eliminate lag or hysteresis so the response will accurately reflect the true pressure differential and will retrace over the operating range without hysteresis. In a preferred form, this is accomplished by a compensating bellows system acting to supplement the response of the opposed bellows. The compensating bellows system is liquid filled and is connected through a restriction with the liquid filling the opposed bellows so that upon any change the effect of the compensating bellows has a rate relating to the change in the pressure differential which modifies the compensation. By this expedient, the compensating bellows system corrects for the lag or hysteresis.

Figure 1:
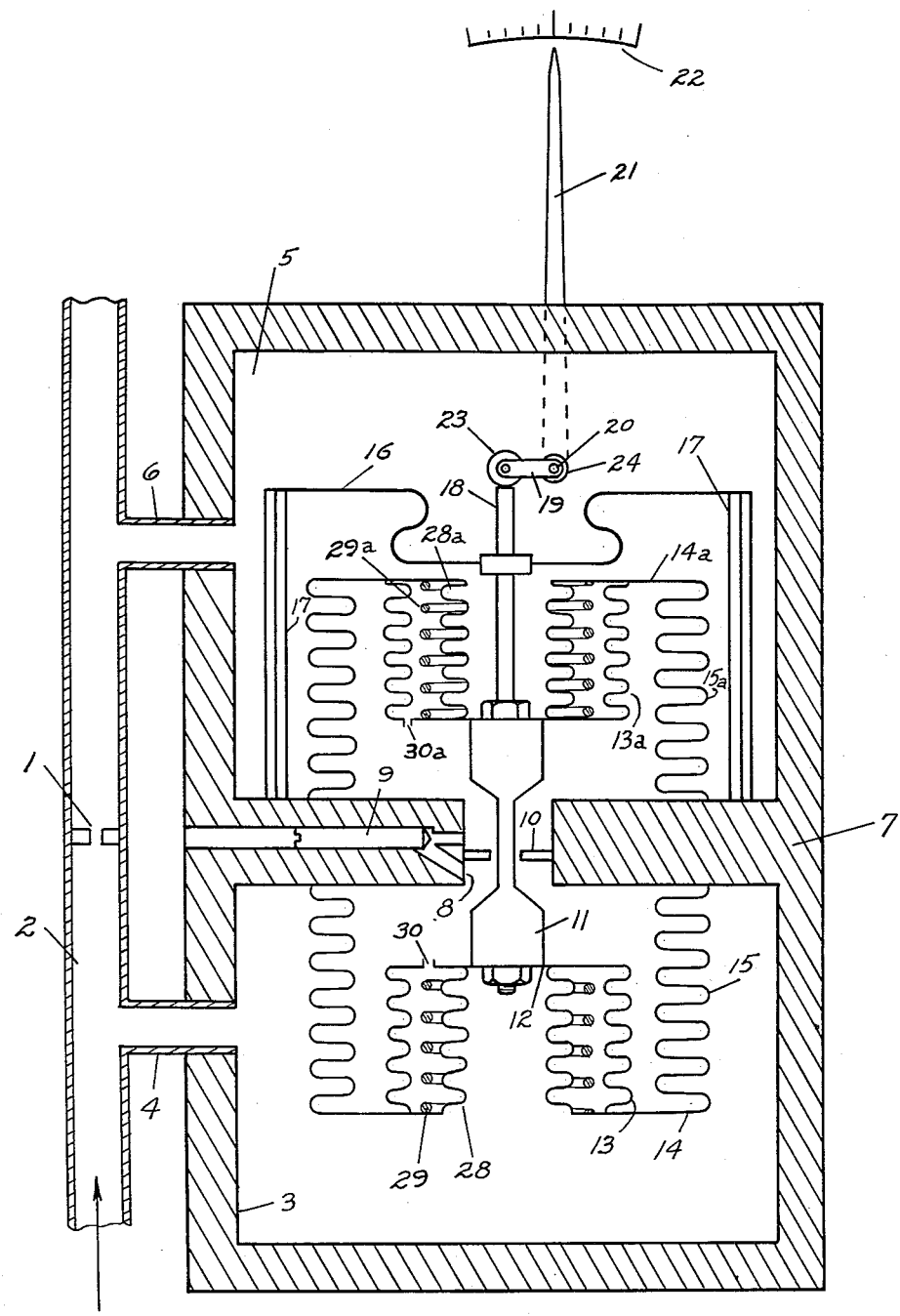
Fig. 1 is a section through a differential pressure measuring device.

In the differential pressure measuring device illustrated in Fig. 1 the drop in pressure across an orifice 1 in a line 2 is used to measure the rate of flow. The pressure on the upstream side of the orifice is connected to a chamber 3 by means of a conduit 4. The pressure on the downstream side of the orifice is connected to a chamber 5 by a conduit 6. The chambers 3 and 5 have a common wall or partition 7 containing a way 8 controlled by a needle valve 9. The ends of the way 8 are on opposite sides of a guide 10 for a rod 11 which extends through the partition 7. One end of the rod 11 is connected to an end plate 12 of bellows 13. The other end of bellows 13 is connected to an end plate 14 of a bellows 15 extending back to the partition 7. The opposite end of the rod 11 is connected to an end plate 12a of bellows 13a which matches the bellows 13. The other end of the bellows 13a is connected to an end plate 14a of bellows 15a which matches the bellows 15 and extends to the opposite side of the partition 7. The space within the bellows 13, 15, 13a, 15a is entirely filled with liquid.

In the structure so far described, the bellows 13 matches the bellows 13a in area and spring constant, and the bellows 15 matches the bellows 15a in area and spring constant. With only this part of the structure, the pressure acting on the bellows 13 and 15 on the upstream side of the orifice 1 is opposed by a lesser pressure acting on the bellows 13a and 15a on the downstream side of the orifice. This results in a movement of the rod 11 to the right as viewed in Fig. 1 by an amount dependent upon the pressure drop across the orifice 1 which corresponds to the flow through the line 2. In order that the same bellows system may be used to measure different ranges of pressure, there is provided a range spring 16 connected to posts 17 mounted on the partition 7 and having its center connected to an extension 18 of the rod 11. The spring 16 which can be easily adjusted opposes the movement of the rod 11 due to the differential pressure acting on the bellows 13, 15 and 13a, 15a. A convenient way of taking off the measurement caused by the deflection of the bellows under the pressure differential is by means of an arm 19 fixed to a shaft 20, carrying a pointer 21 cooperating with a scale 22. The arm carries a roller 23 cooperating with the extension rod 18. A suitable stuffing box 24 is provided for the shaft.

Figure 2:
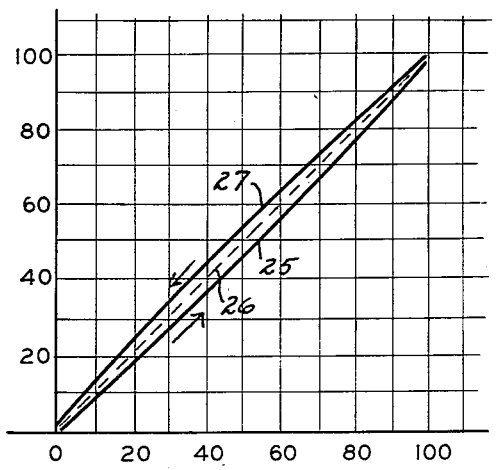
Fig. 2 is a typical response curve for an uncompensated differential pressure measuring device.

While this construction so far described is operative to measure flow as reflected by the differential pressure on opposite sides of the orifice 1, the internal friction in the bellows 13, 15 and 13a, 15a and the friction in the pivots for the shaft 20 introduces a lag in the response so that the pointer 21 does not reflect the true differential pressure across the orifice 1. As the differential pressure is increasing, the response follows a curve 25 which is below the true differential pressure indicated by dotted line 26. On the other hand, when the differential pressure is decreasing the response follows a curve 27, which is above the true differential pressure. This response characteristic exhibited in Fig. 2 is known as hysteresis.

The parts so far described are or may be of common construction.

To compensate for the lag or hysteresis, there is arranged within the bellows 13 and 13a compensating bellows 28 and 28a, respectively, coupled between the end plates 12, 14 and 12a, 14a. Around the bellows 28 and 28a are tension coupling springs 29 and 29a respectively fixed at opposite ends in any suitable manner (not shown) to end plates 12, 14 and 12a, 14a. There are time delay restrictions 30 and 30a respectively in the end plates 12 and 12a which introduce a time delay between the fluid pressure on the inside and outside of the bellows 13 and 13a.

Under equilibrium conditions, the pressure in the liquid within the bellows 13, 15, 28 and 13a, 15a, 28a is the average of the pressure in the chambers 3 and 5 and the displacement of the rod 11 is determined by the area and spring constants of the bellows and by the stiffness of the springs. Since the bellows 13, 15 and 28 match the bellows 13a, 15a and 28a in area and stiffness and the springs 29 and 29a match in stiffness the equilibrium or steady state deflection (neglecting friction) is given by the equation:

$$X = (P_1 - P_2) \frac{A_1 + \frac{k_1 A_3}{k_2 + k_3 + k_4}}{2k_1 + k_5 + \frac{k_1 k_5}{k_2 + k_3 + k_4}} \quad (1)$$

Where $P_1$—pressure in chamber 3
$P_2$—pressure in chamber 5
$A_1$—area of bellows 15, 15a
$k_1$—spring constant of bellows 15, 15a
$A_2$—area of bellows 13, 13a
$k_2$—spring constant of bellows 13, 13a
$A_3$—area of bellows 28, 28a
$k_3$—spring constant of bellows 28, 28a
$k_4$—spring constant of coupling springs 29, 29a
$k_5$—spring constant of range spring 16

It will be noted that all of the bellows and springs enter into the steady state or equilibrium deflection.

Upon a sudden change $\Delta P$ in the pressure differential, the liquid enclosed between the bellows 13, 28 and 13a, 28a is restrained by the restrictions 30, 30a so the bellows 13, 28, 13a, 28a and the springs 29, 29a are effectively rigid and the added deflection of the rod 11 caused by the change in pressure differential (neglecting friction) is given by the equation:

$$x = \text{Initial movement of Rod 11 upon change } \Delta P = \frac{A_1 \Delta P}{2k_1 + k_5} \quad (2)$$

Initially, the bellows 13, 13a, 28, 28a and the springs 29, 29a don't enter into the deflection because these are effectively held rigid by the liquid trapped by the restrictions 30 and 30a.

The deflection of the rod 11 while the bellows 13, 13a, 28, 28a are held rigid produces a pressure differential across the restrictions 30, 30a which lasts until the pressure across the restrictions has time to equalize. When the pressure across the restrictions has equalized, the volume of liquid inside the bellows 13, 13a has changed and the rod 11 is accordingly permitted to move to a steady state or equilibrium position which is given by the equation $$x_1 = \text{Final movement of Rod 11 upon change } \Delta P = \frac{\left(A_1 + \frac{k_1 A_3}{k_2 + k_3 + k_4}\right) \Delta P}{2k_1 + k_5 + \frac{k_1 k_5}{k_2 + k_3 + k_4}} \quad (3)$$

The ratio of the initial movement to the final movement is a measure of the compensation. When the initial and final movements are equal there is no compensation.

Figure 3:
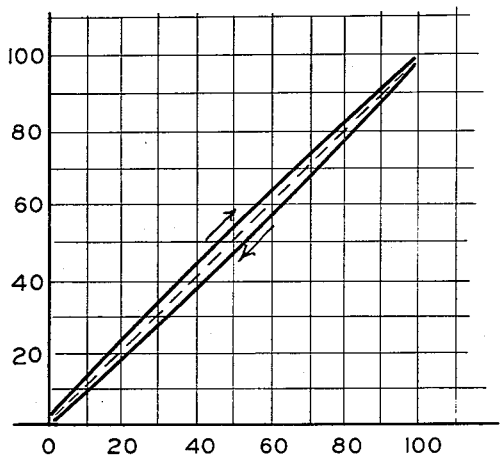
Fig. 3 is a typical response curve for an over compensated differential pressure measuring device.

When the initial movement is greater than the final movement, the compensation is in the direction to offset or overbalance the friction. If the compensation is too great, the effect exhibited in Fig. 3 is obtained where upon increasing pressure differentials the actual indication exceeds the true differential. When the initial movement is less than the final movement there is negative compensation which adds to the friction or hysteresis effect.

The relationship which determines whether the compensation is positive or negative can be determined by dividing the Equation 3 for the final movement by Equation 2 for the initial movement.

$$\frac{x_1}{x} = \frac{1 + \left(\frac{k_1}{k_2 + k_3 + k_4}\right)\left(\frac{A_3}{A_1}\right)}{1 + \left(\frac{k_1}{k_2 + k_3 + k_4}\right)\left(\frac{k_5}{2k_1 + k_5}\right)} \quad (4)$$

From this Equation 4 it can be seen that no compensation is obtained when $$\frac{A_3}{A_1} = \frac{k_5}{2k_1 + k_5} \quad (5)$$

and that when $$\frac{A_3}{A_1} \text{ is less or greater than } \frac{k_5}{2k_1 + k_5}$$

the compensation will be respectively positive and negative.

The presence or absence of the compensation is independent of $k_2$, $k_3$, $k_4$ which together constitute a coupling spring connecting the rod 11 with the end plates of the bellows 15, 15a. However, for any value of $$\frac{A_3}{A_1}$$

which is greater or less than $$\frac{k_5}{2k_1 + k_5}$$

the magnitude of the compensation (negative or positive) can be varied by changing the relation of the coupling springs $(k_1 + k_2 + k_4)$ to the spring constant of the bellows 15, 15a.

The foregoing mathematical analysis is made on the basis of neglecting friction; the magnitude of the compensation perhaps should be more correctly designated as the magnitude of the force which is created to offset or counterbalance the friction which is in fact present, but which was neglected in the analysis.

Figure 4:
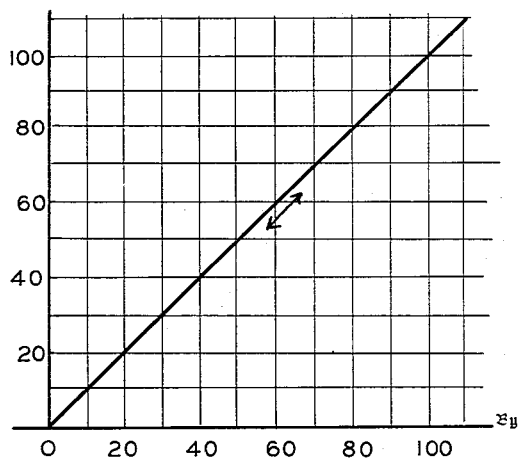
Fig. 4 is a response curve for the Fig. 1 device when correctly compensated.

The mode of operation is apparent from the mathematical analysis. Under steady state conditions, the liquid pressure within all of the bellows is the same and the position of the rod 11 depends upon the differential pressure on opposite sides of the partition 7. This position will involve deflection of all of the bellows. Upon a sudden change in pressure, the liquid trapped between the bellows 13, 28, and 13a, 28a prevents any deflection of the bellows 13, 28 and 13a, 28a so that upon a sudden change in differential pressure the deflection initially is confined to the bellows 15, 15a. Accordingly, the initial deflection upon a change in differential pressure will be different from the final deflection when that change has persisted long enough so that all of the bellows can assume their steady state positions. This results in the corrections represented by Figs. 3 or 4. Fig. 2 shows the uncorrected operation where the bellows 13, 28 and 13a, 28a are omitted and a solid connection substituted for these bellows. Figs. 3 and 4 illustrate the compensating effect obtained by the bellows 13, 28 and 13a, 28a. Fig. 4 represents perfect compensation. Fig. 3 represents over-compensation. Naturally, where the construction affords the opportunity for compensation, such construction also affords the opportunity for over or under compensation. That is a matter of design.

What is claimed as new is:

1. A device responding to the difference in pressure on opposite sides of a partition comprising a pair of opposed bellows, one on each side of the partition, said bellows forming an envelope filled with liquid, and a rod extending through the partition and having a force transmitting connection to each of the bellows, one of the connections including a spring and another bellows, means providing a restricted passageway connecting the other bellows to the envelope whereby said other bellows upon change in pressure differential on opposite sides of the partition provides a modified rate to the force transmitted to the rod.

2. A differential pressure responsive device comprising a pair of opposed bellows respectively exposed to one and the other of two pressures, said bellows forming an envelope filled with liquid whereby the pressure of liquid under equilibrium conditions is the average of the two pressures, a rod having force transmitting connection means to each of the bellows whereby under equilibrium conditions the rod assumes a position corresponding to the difference between the two pressures, the connection means including a spring and supplemental bellows, and means providing a restricted passageway connecting the supplemental bellows to the envelope whereby the action of the supplemental bellows on the rod provides a modified rate to the force transmitted to the rod.

3. A device responding to the difference in pressure on opposite sides of a partition comprising a pair of opposed bellows, one on each side of the partition with free ends extending in opposite directions away from the partition, said bellows forming a first envelope filled with liquid, a rod extending through the partition and having a connection to each of the bellows, each of said connections including a spring, and a pair of compensating bellows connected between the free end of said first bellows and the rod, said compensating bellows defining a second liquid containing envelope means providing a restricted passageway connecting the first and second envelopes whereby said compensating bellows upon change in pressure differential on opposite sides of the partition provides a modified rate to the force transmitted to the rod.

4. A device responsive to the difference in pressure on opposite sides of a partition, comprising a liquid filled envelope on opposite sides of the partition including a pair of opposed bellows, one on each side of the partition, a rod extending through the partition and having a force transmitting connection to each of the first two bellows, one of the connections including another bellows, and means providing a restricted passageway connecting said other bellows to the envelope whereby said other bellows upon change in pressure differential on opposite sides of the partition provides a modified rate to the force transmitted to the rod.

References Cited in the file of this patent

UNITED STATES PATENTS

| | | |
|---|---|---|
| 1,800,463 | Meiken | Apr. 14, 1931 |
| 2,297,872 | Carter | Oct. 6, 1942 |
| 2,466,071 | Barnes | Apr. 5, 1949 |
| 2,520,468 | Moore | Aug. 29, 1950 |
| 2,590,324 | Jones | Mar. 25, 1952 |